United States Patent
Clapper (10) Patent No.: US 7,594,019 B2
(45) Date of Patent: Sep. 22, 2009

(54) SYSTEM AND METHOD FOR ADULT APPROVAL URL PRE-SCREENING

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 10/712,641

(22) Filed: Nov. 12, 2003

(65) Prior Publication Data

US 2005/0102407 A1 May 12, 2005

(51) Int. Cl.
G06F 15/16 (2006.01)
(52) U.S. Cl. .................... 709/227; 709/228; 709/203
(58) Field of Classification Search .................... None
See application file for complete search history.

(56) References Cited

U.S. PATENT DOCUMENTS

| | | | | |
|---|---|---|---|---|
| 5,911,043 | A * | 6/1999 | Duffy et al. ................. | 709/203 |
| 7,120,687 | B1 * | 10/2006 | Tessman et al. ............. | 709/224 |
| 2002/0124252 | A1 * | 9/2002 | Schaefer et al. ............. | 725/33 |
| 2003/0005135 | A1 * | 1/2003 | Inoue et al. ................. | 709/229 |
| 2003/0066075 | A1 * | 4/2003 | Bahn et al. .................. | 725/25 |
| 2003/0097452 | A1 * | 5/2003 | Kim et al. ................... | 709/229 |
| 2003/0163731 | A1 * | 8/2003 | Wigley et al. ............... | 713/201 |
| 2004/0003071 | A1 * | 1/2004 | Mathew et al. ............. | 709/223 |
| 2004/0006621 | A1 * | 1/2004 | Bellinson et al. ........... | 709/225 |
| 2004/0051733 | A1 * | 3/2004 | Katzir ........................ | 345/741 |
| 2005/0155052 | A1 * | 7/2005 | Ostrowska et al. .......... | 725/25 |

* cited by examiner

*Primary Examiner*—John B. Walsh
(74) *Attorney, Agent, or Firm*—Joni D. Stutman (57) ABSTRACT

A system and method for adult URL pre-screening. A URL request made by a child on a first computer is received by a gatekeeper. The gatekeeper compares the requested URL to URL entries in an approved URL table. If the requested URL is found in the approved URL table, permission is granted for enabling the child on the first computer to browse a Web page associated with the requested URL. If the requested URL is not found in the approved URL table, the gatekeeper accesses the Web page associated with the requested URL, generates a thumbnail of the Web page, and alerts a parent/guardian operating the second computer via an alert icon. The parent/guardian may view the thumbnail of the Web page by placing their mouse over the alert icon. The thumbnail includes a set of approval options from which to allow the parent/guardian to approve or deny access of the Web page for the child on the first computer to browse.

47 Claims, 6 Drawing Sheets

SYSTEM AND METHOD FOR ADULT APPROVAL URL PRE-SCREENING

BACKGROUND OF THE INVENTION

1. Field of the Invention

The present invention is generally related to Internet technology. More particularly, the present invention is related to a system and method for parental control of Internet Web sites viewed by a child in a network environment.

2. Description

Web sites accessible via the Internet contain all sorts of content. Some of the content may not be desirable for children. To prevent children from browsing undesirable Web content, some browsers enable the filtering of undesirable Internet content by enabling children to only browse from a selected list of Web sites.

Parental monitoring services also exist that provide a database on the home computer that is maintained by a service provider subscribed to by the parent. The service provider keeps track of acceptable Web sites for children. Web sites inappropriate for children are excluded from the database. The database is periodically updated by the service provider.

New Web sites are added to the Internet on a daily basis. Often times the parental monitoring service may not be aware of the new Web sites that are acceptable for children for weeks or months. Also, these services do not allow the parent to make their own discretionary choices as well as to add or subtract from the database in real-time the Web sites available to their children. Thus, new acceptable Web sites may or may not be included in the database for weeks or months.

Thus, what is needed is a system and method for enabling a parent to have first-view rights as to what their child is trying to access on the Internet in real-time. What is also needed is a system and method that allows the parent to approve or deny access to a child's Web site request prior to the child's ability to browse the Web site. What is further needed is a system and method that allows the parent to investigate links associated with the child's requested Web site, thereby allowing the child access to an acceptable Web site, yet preventing the child from viewing links that include undesirable content.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for enabling a parent to have first-view rights as to what their child is trying to access on the Internet in real-time. The parent, after viewing the Web site, may deny or approve access to the Web site by the child. This is accomplished by implementing a gatekeeper. The gatekeeper allows the parent to view the Web site prior to the child having access to the requested site. If the parent does not approve of the Web site, access to the Web site is denied to the child via the gatekeeper. If the parent does approve of the Web site, access to the Web site by the child is allowed via the gatekeeper. The gatekeeper also keeps a log of all requested Web sites for each child. All approved Web sites are maintained in a database, such that when a child requests a Web site that has already been approved by the parent, the gatekeeper will allow the child access to the Web site without querying the parent.

Embodiments of the present invention are described as being implemented in a home network environment. Although embodiments of the present invention are being described as being implemented in a home network environment, one skilled in the relevant art(s) would know that embodiments of the present invention may also be implemented in other networking environments. Such networking environments may include, but are not limited to, a school network environment where the principal, teachers, and/or counselors may provide approval or disapproval of Web sites for student access.

Figure 1:
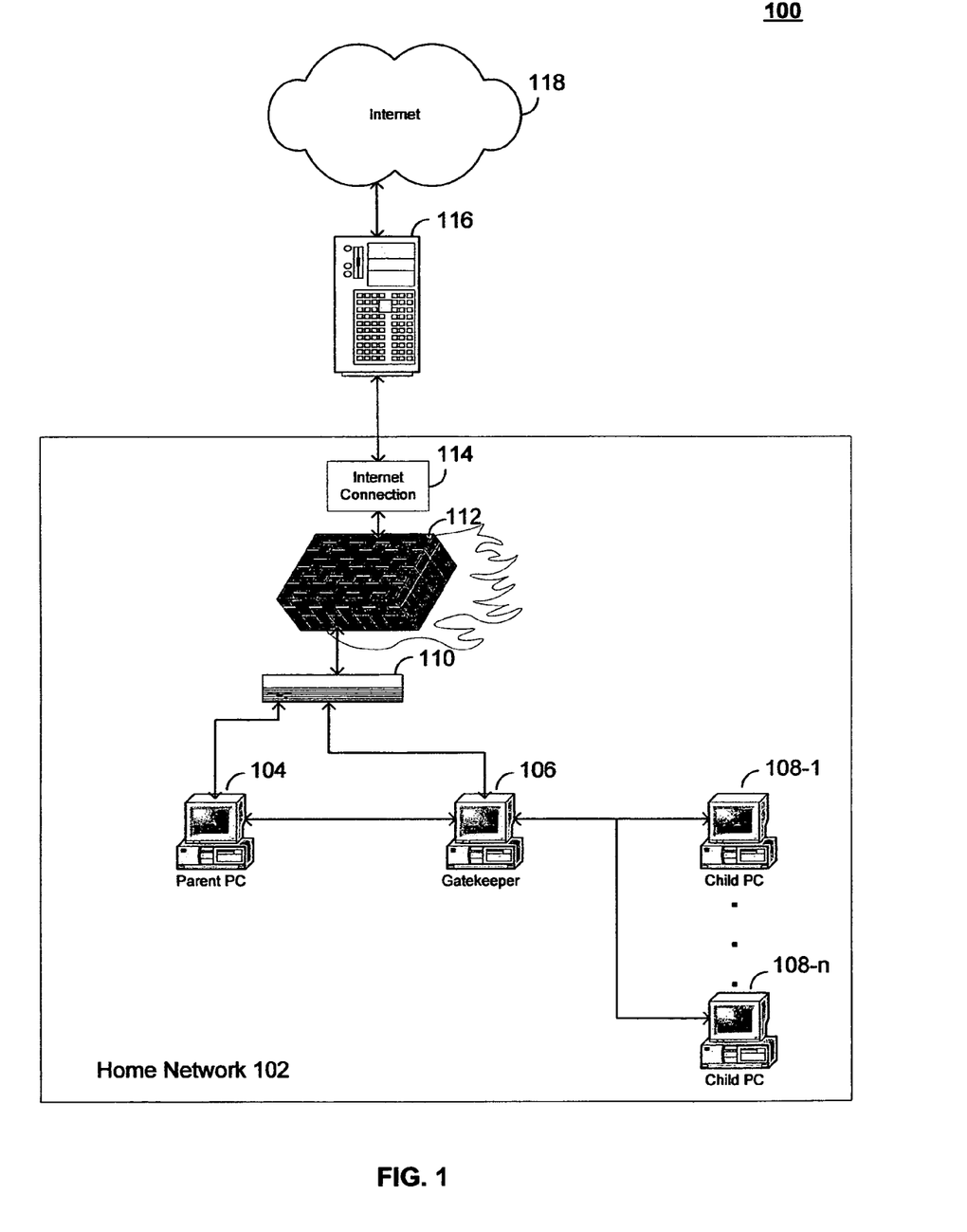
FIG. 1 is a block diagram illustrating an exemplary system in which the present invention may be implemented according to an embodiment of the present invention.

FIG. 1 is a block diagram illustrating an exemplary home network system 100 in which the present invention may be implemented according to an embodiment of the present invention. Home network system 100 may include a home network 102 that is coupled to a wide area network (WAN), such as the Internet 118, via an ISP (Internet Service Provider) server 116. Home network 102 may be coupled to ISP server 116 using an Internet connection 114, such as, a dial-in connection, a high-speed cable modem, a digital subscriber line (DSL), or any other means capable of connecting home network 102 to ISP server 116.

Home network 102 is a local area network (LAN) that may connect, computers, televisions, audio/video players, and other home equipment using a wired medium, such as, for example, Ethernet. Home network equipment may also be connected using a wireless medium, such as Bluetooth or any other wireless protocol based on the IEEE 802.11 standard, IEEE Standards for Information Technology/Telecommunications and Information Exchange Between Systems, ISO/IEC 8802-11 (1999). Home network 102 comprises, inter alia, a personal computer (PC) 104 having the ability to be accessed by adults only, such as a parent or guardian (also referred to as a parent PC), a gatekeeper PC 106, one or more PCs 108-1 . . . 108-n having the ability to be accessed by one or more children (also referred to as child PCs), a combination hub/router 110, a firewall 112, and Internet connection 114.

Parent PC 104 is coupled to gatekeeper 106 and hub/router 110. Gatekeeper 106 is coupled to parent PC 104, hub/router 110, and child PCs 108-1 . . . 108-n. Hub/router 110 is coupled to parent PC 104, gatekeeper 106, and firewall 112. Firewall 112 is coupled to Internet connection 114 and hub/router 110. Internet connection 114 is coupled to Internet 118 via ISP server 116.

Parent PC 104, gatekeeper computer 106, and child PCs 108-1 . . . 108-n are each personal computers (PCs). PCs have their own operating system, software, and peripherals to enable them to operate independently. Each PC (104, 106, and 108-1 . . . 108-n) includes a network interface (not shown) to enable a network configuration of each PC in home network 102. PCs are well known to those skilled in the relevant art(s).

Parent PC 104 may be used by a parent or guardian. Child PCs may be used by children within the home. In a home network where only one child exists, home network 102 may only include one child PC 108-1. Where two or more children exist, home network 102 may include two or more child PCs 108-1 . . . 108-n, one child PC for each child in the family. In this instance, each child is identified by their PC. Alternatively, where two or more children exist, home network 102 may have one child PC 108-1. In this instance, each child is identified by a login name.

Where one or more children exist, home network 102 may include a plurality of child PCs 108-1 . . . 108-n, each child having a plurality of accounts. In one embodiment, each account may be associated with a different child PC 108-1 . . . 108-n. In another embodiment, each child may use any account on any one of the plurality of child PCs 108-1 . . . 108-n.

Gatekeeper PC 106 acts as an access controller to control access to Internet 118 by one or more child PCs 108-1 . . . 108-n. Parent PC 104 manages gatekeeper PC 106. The functionality of gatekeeper 106 may be implemented in hardware, software, or a combination thereof.

Child PCs 108-1 . . . 108-n request access to Internet 118 through gatekeeper PC 106. Permission to access a Web page on Internet 118 is granted by parent PC 104 via gatekeeper 106. Gatekeeper PC 106 restricts Internet access on each child PC (108-1 . . . 108-n) by receiving all URL (Uniform Resource Locator) requests made from any child PC (108-1 . . . 108-n) and comparing the requested URL to a table or database of acceptable URLs for the corresponding child. If the URL is included in the table of acceptable URLs, an automatic grant is sent from gatekeeper PC 106 to the corresponding child PC (108-1 . . . 108-n). The automatic grant enables the child to access the Web page associated with the requested URL via gatekeeper 106. If the URL is not included in the table of acceptable URLs, gatekeeper PC 106 accepts the request from the corresponding child PC, retrieves the Web page corresponding to the requested URL from the Internet, and sends the corresponding Web page to parent PC 104 to be previewed by the parent/guardian for acceptable viewing by the child.

In one embodiment, the URL data is passed to the parent/guardian PC. A rendered thumbnail of the Web page may be used as an icon that the parent clicks on with a pointing device, such as, but not limited to, a mouse, to activate access of the link. Thus, in this embodiment, the entire Web page is not cached and sent to the parent/guardian.

To provide high speed Internet access to home network 102, Internet connection 114 is coupled to hub/router 110. As previously indicated, Internet connection 114 may include, but is not limited to, a cable modem, a DSL modem, or any other high speed means of providing Internet access. The hub portion of hub/router 110 connects Parent PC 104, gatekeeper PC 106, and child PCs 108-1 . . . 108-n, via gatekeeper PC 106, together in order to share files and devices, such as, but not limited to, printers (not shown), scanners (not shown), etc. The router portion of hub/router 110 connects all of the PCs (104, 106, and 108-1 . . . 108-n) to Internet 118 via ISP 116, firewall 112, and Internet connection 114. In order for hub/router 110 to interact with Internet 118, an IP (Internet Protocol) address is needed. The IP address is provided by ISP server 116. Internal IP addresses are provided by hub/router 110 for each PC within home network 102. In the embodiment shown in FIG. 1, parent PC 104 and gatekeeper PC 106 are provided internal IP addresses. Child PCs 108-1 . . . 108-n receive Internet content via gatekeeper 106, and are differentiated by gatekeeper PC 106, not by hub/router 110 via internal IP addresses.

Firewall 112 is used to protect PCs 104, 106, and 108-1 . . . 108-n against hackers and other dangers on Internet 118. Firewall 112 stops hackers from breaking into home network 102.

Figure 2:
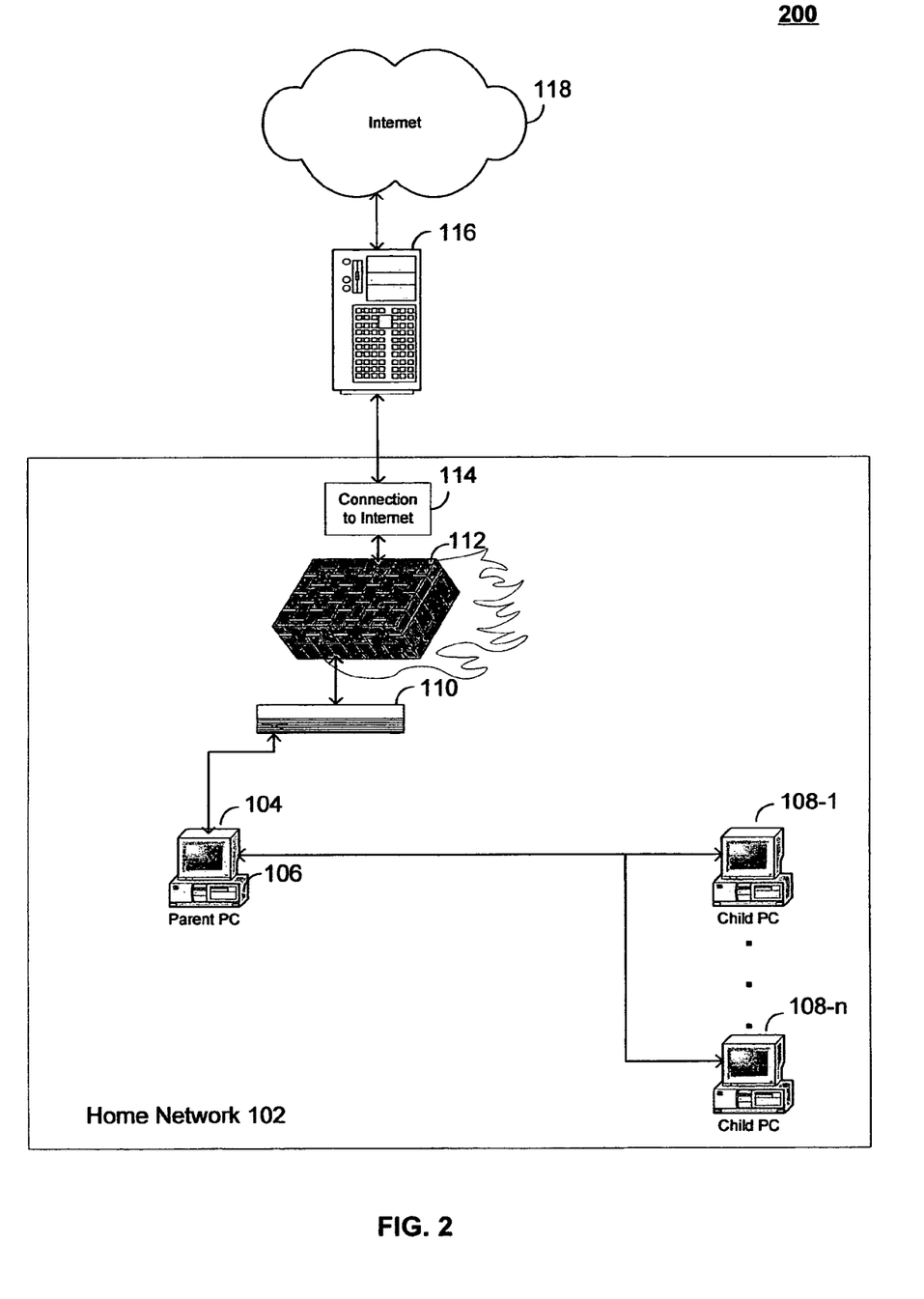
FIG. 2 is a block diagram illustrating another exemplary system in which the present invention may be implemented according to an embodiment of the present invention.

In one embodiment, gatekeeper 106 may be implemented on parent PC 104 as shown in FIG. 2. According to this embodiment, parent PC 104 acts as a proxy server and controls the functionality of gatekeeper 106 to prevent direct access to Internet 118 via child PCs 108-1 . . . 108-n. Gatekeeper 106 may be implemented in hardware, software, or a combination thereof. Child PCs 108-1 . . . 108-n are coupled directly to parent PC 104, thus, preventing direct access to Internet 118 by any child PC (108-1 . . . 108-n). In other words, Web content from Internet 118 for any child PC 108-1 . . . 108-n must go through parent PC 104 since parent PC 104 is the only PC directly connected to Internet 118.

Figure 3:
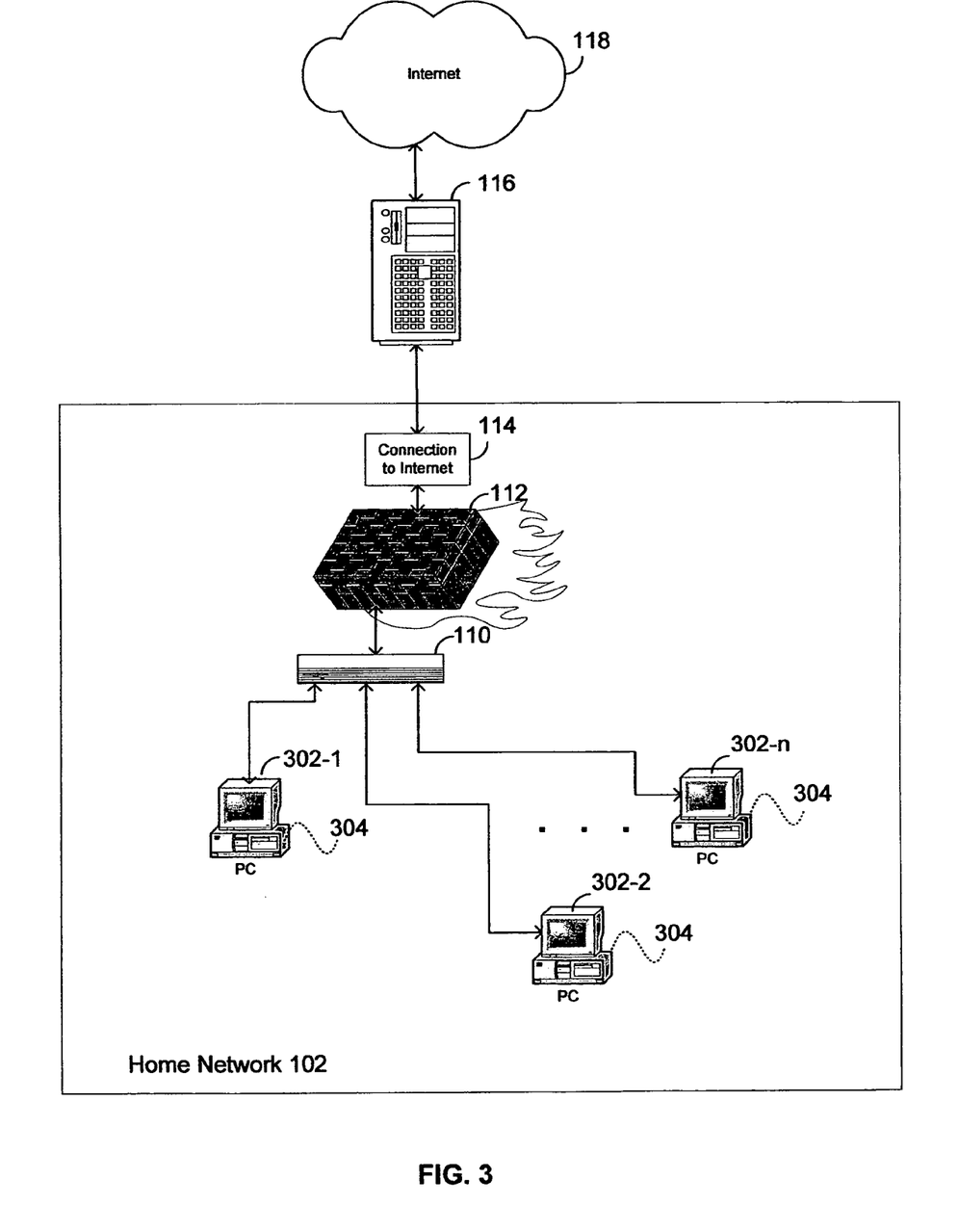
FIG. 3 is a block diagram illustrating another exemplary system in which the present invention may be implemented according to an embodiment of the present invention.

FIG. 3 is a block diagram illustrating another exemplary system in which the present invention may be implemented according to an embodiment of the present invention. In this embodiment, gatekeeper 304 (shown in phantom) is distributed within each PC 302-1, 302-2, . . . 302-n in home network 102. Each user, i.e., parent/guardian and children, is identified by their login identification. A PC identified as having a parent/guardian login will be the managing PC for gatekeeper 304. PCs identified as having a child login will have their URL requests routed to the managing PC for permission via gatekeeper 304 to view a Web page associated with the requested URL as previously described.

Although the above embodiments of the system have included traditional PCs, the invention is not limited to this embodiment. In fact, a television having an enhanced set-top box may be substituted for any or all of the PCs in the home network. In fact, complex set-top boxes that include high quality processors, such as, but not limited to, mobile Intel® processors manufactured by Intel Corporation, add personal computer (PC) functions to the set-top box. The set-top box allows one to browse the Internet in a manner similar to a traditional PC.

Figure 4A:
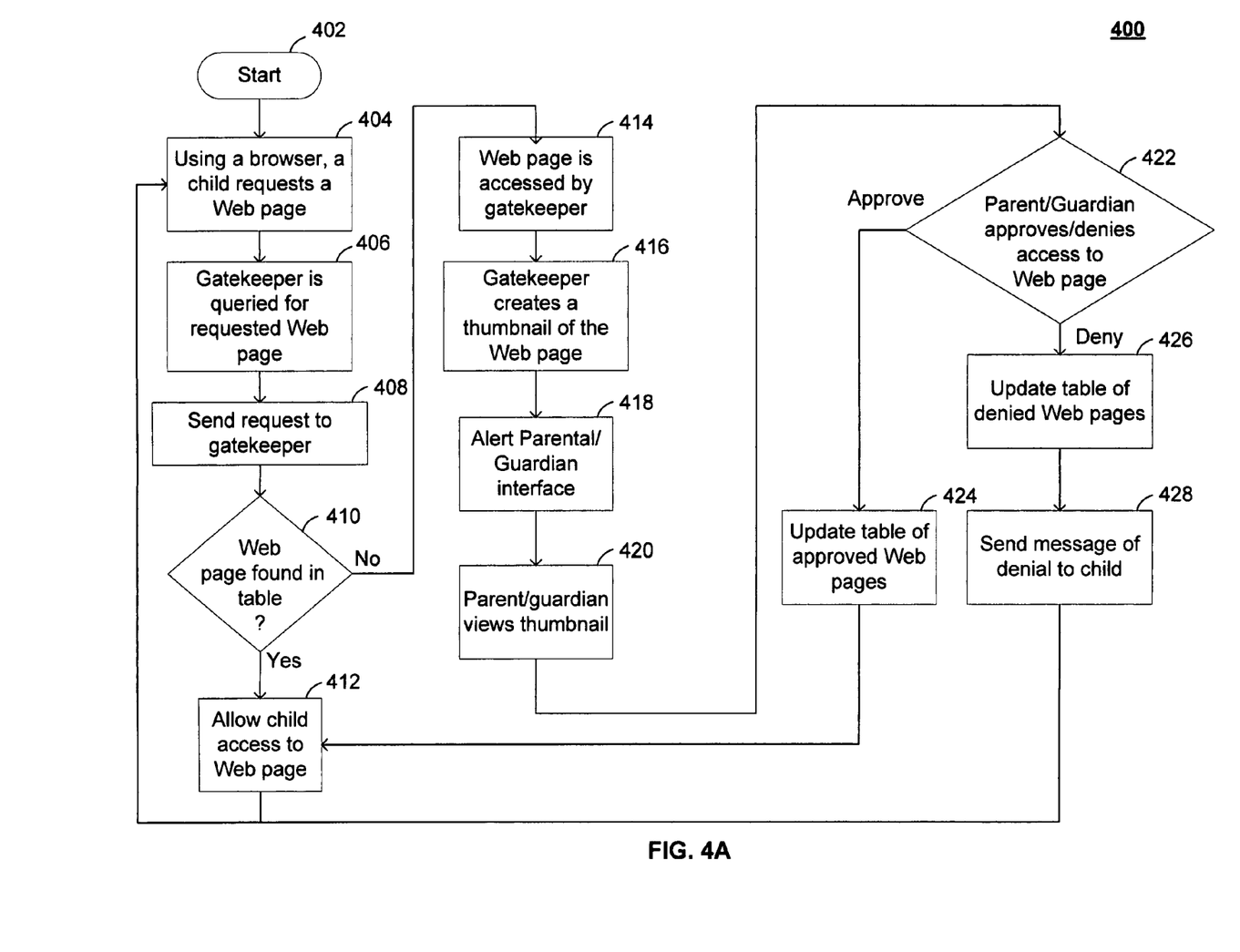
FIG. 4A is a flow diagram 400 describing a method for parent/guardian approval URL pre-screening according to an embodiment of the present invention.

FIG. 4A is a flow diagram 400 describing a method for parent/guardian approval URL pre-screening according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, using a browser, a child makes a request to view a Web page. In other words, a child enters a URL into their Web browser for a location they want to visit.

Direct Internet access is restricted on the child's PC. Thus, in block 406, an application on the child's PC sends the URL request to the gatekeeper. In one embodiment, the application may be a custom plug-in for the browser. The browser may include a tool bar notification icon to indicate that the URL has been sent to the gatekeeper for permission to view. In another embodiment, the application may be separate from the browser, yet operate in parallel with the browser. When the child makes a URL request, the application, being aware of all browser activity and URL requests, will direct the request to the gatekeeper. A pop-up dialog from the application may be used to notify the child that the URL has been sent to the gatekeeper for permission to view.

In many instances, children may request multiple URLs before access to the first request is approved or denied. In this case, the URLs are put into a queue within the gatekeeper for handling by the parent/guardian. In one embodiment, limited queuing may exist. For example, the queue may be limited to five requests. After five requests have been made, a sixth request will not enter the queue until the first request has been approved or denied by the parent/guardian. In another embodiment, unlimited queuing may exist. In this instance, no limitations are put on the number of URL requests that may be in the queue awaiting approval.

The gatekeeper maintains a table or database of accepted URLs for each child. In block 408, the gatekeeper will compare the requested URL with the accepted URLs in the table. In decision block 410, it is determined whether the requested URL is found in the table. If the requested URL is found in the table, an automatic grant is sent to the child's PC indicating that the child may have access to the Web page in block 412. The Web page is then routed via the gatekeeper to the child's PC for the child to browse. In one embodiment, a notice is sent to the parent/guardian that the child has been granted access to the requested URL. Optionally, the request as well as the grant may be logged. The process then proceeds back to block 404, where the child may make another URL request if the child so desires.

Returning to decision block 410, if it is determined that the requested URL is not found in the table, the process proceeds to block 414. In block 414, the Web page identified by the requested URL is accessed by the gatekeeper. A thumbnail of the Web page is created by the gatekeeper in block 416.

The parent/guardian is then notified of the request in block 418. The request may be in the form of an alert indicator. In one embodiment, the alert indicator may be a blinking icon. In another embodiment, an icon may change color, such as going from gray to red, with red being an indication that action is required by the parent/guardian. In yet another embodiment, an icon may change bitmap or animate. One skilled in the relevant art(s) would know that other methods of notification may also be used. Notification of the request to the parent/guardian also preloads the thumbnail into a browser of parent/guardian PC.

Figure 4B:
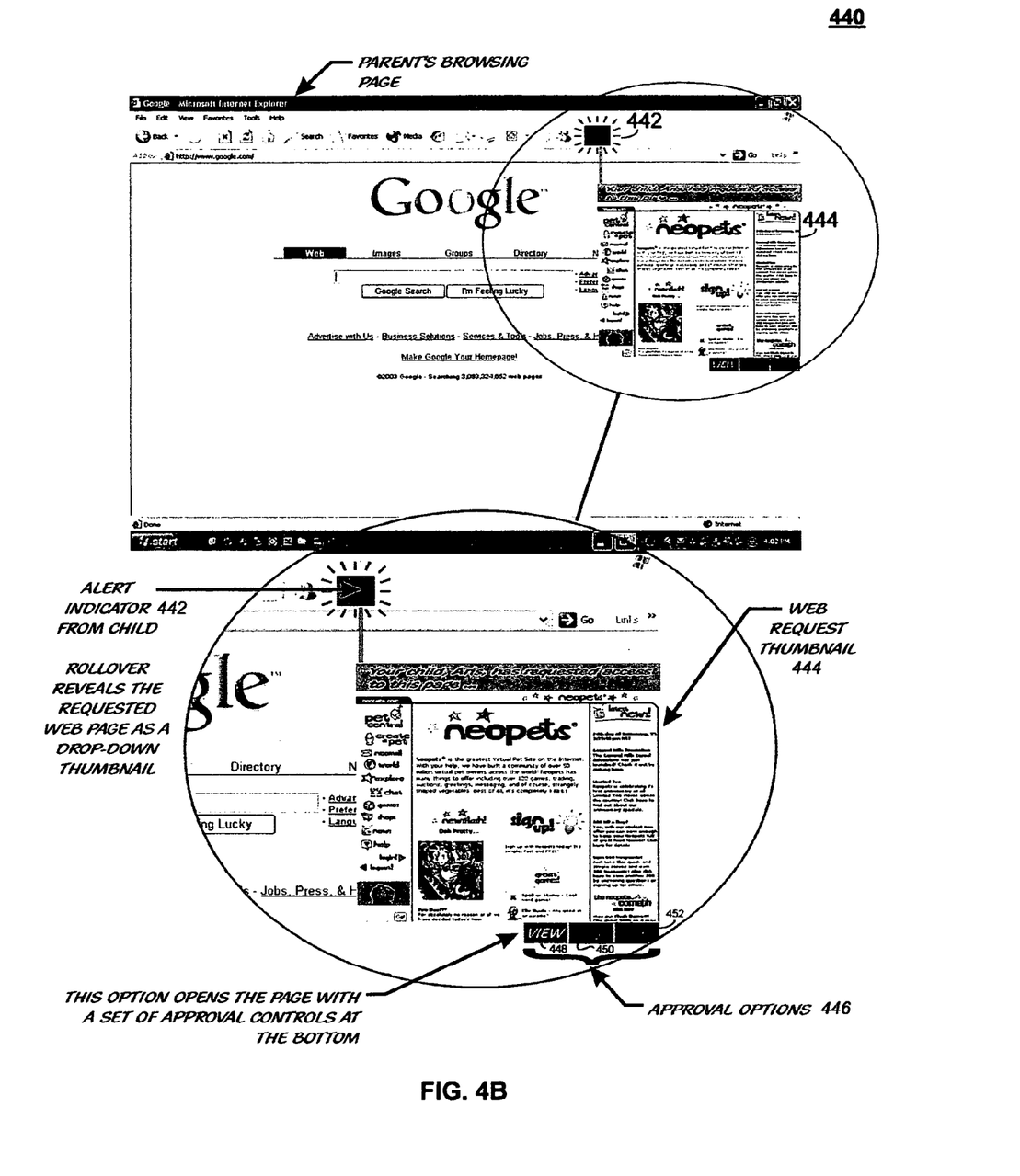
FIG. 4B illustrates a thumbnail display of a requested Web page according to an embodiment of the present invention.

In block 420, the parent/guardian may view the thumbnail of the Web page by placing their mouse over the blinking icon as shown in FIG. 4B. In one embodiment, a window 440 may drop down from the icon 442, allowing the parent/guardian to view a thumbnail 444 of the requested Web page. In one embodiment, the parent may click on the blinking icon 442 to view a full frame of the requested Web page.

A set of approval controls 446 are included with each thumbnail. In one embodiment, the set of approval controls include view 448, thumbs up 450 (indicating approval) and thumbs down 452 (indicating disapproval). A parent may select the view option 448 to view the Web page. When this occurs, a special frame is used. The frame preserves the control options. A parent may opt to approve the Web page by selecting the thumbs up option 450. A parent may also opt to disapprove the Web page by selecting the thumbs down option 452.

Although an embodiment of the present invention is illustrated as having approval controls view 448, thumbs up 450, and thumbs down 452, the invention is not limited to these approval controls. In fact, one skilled in the relevant art(s) would know that other approval controls may also be used. For example, a chat control may be implemented in the set of approval controls that enable the parent, via a chat window, to communicate with the child. For example, the parent may request additional information from the child regarding the Web site. Such information may query the child as to how they found out about the Web page, why the child wants to browse the Web page, etc. In one embodiment, the chat window may be used to communicate with others outside of the family unit, such as, but not limited to, other parents, parent groups, teachers, etc.

In one embodiment, the approval controls 446 may include drop down menus (not shown) that include additional levels of acceptance and denial for a URL request. For example, Web pages include links to other Web pages. A parent/guardian, after reviewing the links, may decide that the child may only have permission to view the Web page. In another instance, the parent/guardian may decide to allow the child to view the Web page with a link depth of four. Links that already have approval are always allowed. A parent/guardian may also approve a Web page for viewing over a time frame. For example, a parent/guardian may allow the child to view a game Web page on weekends only. In this case, the gatekeeper will have to remove the game Web page from the acceptance table during weekdays and enter the game Web page in the acceptance table during weekends. Another acceptance level may enable the parent/guardian to allow unlimited access to the requested Web page, but limit access to the links. Thus, the link depth could have a different expiration than the requested Web page.

Approval controls 446 for the denial option may include, but are not limited to, deny for a predetermined amount of time (to be specified by the parent/guardian), deny until parent/guardian can consult with someone else or do more research, ask again later, etc.

In decision block 422, the parent/guardian approves or denies the child access to the Web page. Note that the parent/guardian must make a decision to move to the next requested Web page. If the parent/guardian approves viewing of the Web page by the child, the process proceeds to block 424.

In block 424, the table or database of approved Web pages/URLs for the child in question is updated. The process then proceeds to block 412, where the child is granted access to the Web page.

Returning to decision block 422, if the parent/guardian denies the child access to the Web page, the process proceeds to block 426.

In block 426, the table or database of denied Web pages/URLs for the child in question is updated. The process then proceeds to block 428.

In block 428, a message is sent to the child indicating denial of the Web page for viewing by the child. The process then proceeds back to block 404 to obtain another URL request.

Often times a parent/guardian may not be available to receive an alert on their PC. In one embodiment, the parent/guardian may be notified via the home television that is connected to home network 102.

In another embodiment, proxy gatekeepers, such as trusted friends and family, may be used to monitor and approve Web pages requested by the child via the Internet.

In another embodiment, a parent may remain actively engaged in the monitoring process even while away from their PC. Other devices, owned by the parent, may be notified by the gatekeeper to allow the parent/guardian to perform interactive monitoring. For example, if a response from the parent/guardian is not received within a predetermined time frame, the parent/guardian may be notified by the gatekeeper via an email, instant messaging, etc. on their work computer, PDA (personal digital assistant), cell phone, or other mobile devices. A list of devices may be used by the gatekeeper to notify the parent/guardian. For example, if the parent/guardian is not available at their PC, the gatekeeper may send a message to the parent/guardian's work PC. If no response is obtained within a predetermined time frame, the gatekeeper may send a message to the parent/guardian's cell phone. If no response is obtained, then the PDA will be notified. This process will repeat until the list of devices are exhausted with no response from the parent/guardian.

Figure 5:
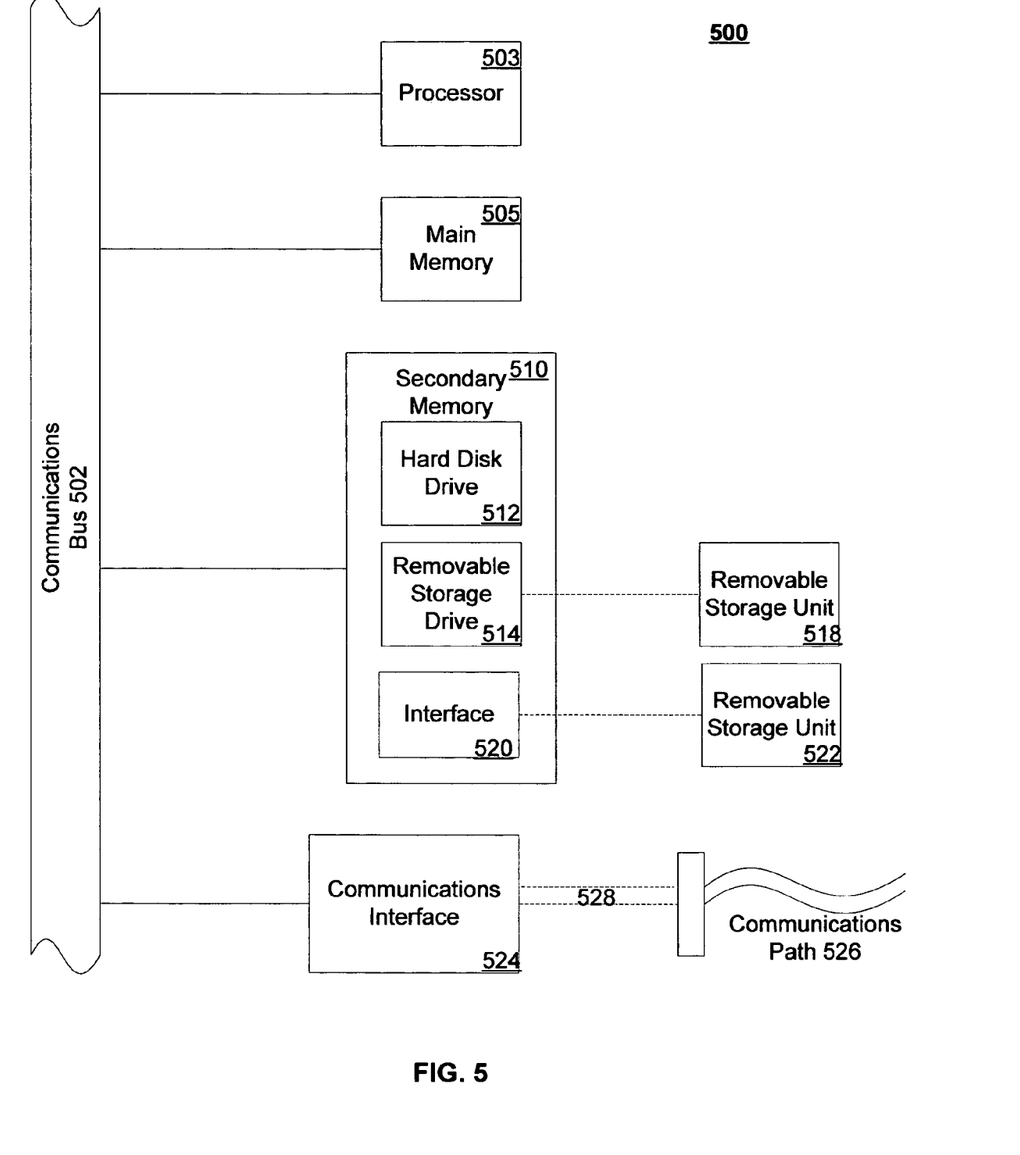
FIG. 5 is a block diagram illustrating an exemplary computer system in which certain aspects of the invention may be implemented.

Embodiments of the present invention may be implemented using hardware, software, or a combination thereof and may be implemented in one or more computer systems or other processing systems. In fact, in one embodiment, the invention is directed toward one or more computer systems capable of carrying out the functionality described here. An example implementation of a computer system 500 is shown in FIG. 5. Various embodiments are described in terms of this exemplary computer system 500. After reading this description, it will be apparent to a person skilled in the relevant art how to implement the invention using other computer systems and/or computer architectures.

Computer system 500 includes one or more processors, such as processor 503. Processor 503 is connected to a communication bus 502. Computer system 500 also includes a main memory 505, preferably random access memory (RAM) or a derivative thereof (such as SRAM, DRAM, etc.), and may also include a secondary memory 510. Secondary memory 510 may include, for example, a hard disk drive 512 and/or a removable storage drive 514, representing a floppy disk drive, a magnetic tape drive, an optical disk drive, etc. Removable storage drive 514 reads from and/or writes to a removable storage unit 518 in a well-known manner. Removable storage unit 518 represents a floppy disk, magnetic tape, optical disk, etc., which is read by and written to by removable storage drive 514. As will be appreciated, removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM (erasable programmable read-only memory), PROM (programmable read-only memory), or FLASH memory, such as FLASH memory device 100) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA (personal computer memory card international association) slot and card, a wireless LAN (local area network) interface, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. Channel 526 carries signals 528 and may be implemented using wire or cable, fiber optics, a phone line, a cellular phone link, a wireless link, and other communications channels.

In this document, the term "computer program product" refers to removable storage units 518, 522, and signals 528. These computer program products are means for providing software to computer system 500. Embodiments of the invention are directed to such computer program products.

Computer programs (also called computer control logic) are stored in main memory 505, and/or secondary memory 510 and/or in computer program products. Computer programs may also be received via communications interface 524. Such computer programs, when executed, enable computer system 500 to perform the features of the present invention as discussed herein. In particular, the computer programs, when executed, enable processor 503 to perform the features of embodiments of the present invention. Accordingly, such computer programs represent controllers of computer system 500.

In an embodiment where the invention is implemented using software, the software may be stored in a computer program product and loaded into computer system 500 using removable storage drive 514, hard drive 512 or communications interface 524. The control logic (software), when executed by processor 503, causes processor 503 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for monitoring Internet browsing, comprising:
   receiving a URL (universal resource locator) request from a first computer;
   comparing the URL request with URL entries in an approved table of information;
   if the requested URL is found in the approved table of information, permitting access of the URL request by the first computer;
   if the requested URL is not found in the approved table of information, enabling an operator of a second computer to determine whether to grant access of the requested URL to the first computer,
   wherein enabling an operator of a second computer to determine whether to grant access of the requested URL to the first computer comprises:
   accessing a Web page identified by the requested URL;
   generating a thumbnail of the Web page;
   alerting the operator of the second computer of the requested URL; and
   enabling the operator of the second computer to view the thumbnail of the Web page on the second computer, wherein the operator grants access if the Web page is approved and denies access if the Web page is disapproved.

2. The method of claim 1, wherein the first computer is operated by a child and the operator of the second computer is a parent/guardian.

3. The method as recited in claim 1, wherein permitting access of the URL request by the first computer if the requested URL is found in the approved table of information further comprises:
   accessing a Web page identified by the requested URL; and
   routing the Web page to the first computer for browsing, wherein the operator of the second computer is notified that access to the Web page has been granted to the first computer.

4. The method of claim 1, wherein alerting the operator of the second computer of the requested URL comprises enabling an alert icon to do one of blink, change color, blink and change color, change bitmap, and animate.

5. The method of claim 1, wherein enabling the operator of the second computer to view the thumbnail of the Web page on the second computer comprises enabling the operator to place a mouse over an alert icon, wherein placement of the mouse over the alert icon causes a window of the thumbnail of the Web page to drop down.

6. The method of claim 1, wherein enabling the operator of the second computer to view the thumbnail of the Web page on the second computer comprises enabling the operator to click on an alert icon, wherein clicking the alert icon causes a browsable full frame of the requested Web page to be viewed.

7. The method of claim 1, wherein the thumbnail comprises a set of approval controls for enabling the operator of the second computer to approve or disapprove access to the Web page by the first computer.

8. The method of claim 7, wherein the set of approval controls include an approve control, the approve control including a drop down menu, the drop down menu including a plurality of acceptance options from which the operator may select.

9. The method of claim 8, wherein the plurality of acceptance options comprise a link depth and a time period in which the Web page may be viewed.

10. The method of claim 7, wherein the set of approval controls include a denial control, the denial control including a drop down menu, the drop down menu including a plurality of denial options from which the operator may select.

11. The method of claim 10, wherein the plurality of denial options includes denial for a predetermined period of time, denial to consult with another, denial to perform research, and denial: ask again later.

12. The method of claim 1, wherein multiple URLs are requested by the first computer, each URL being placed in a queue awaiting approval.

13. The method of claim 12, wherein the queue is a limited queue with a maximum predetermined number of URLs allowed in the queue.

14. The method of claim 12, wherein the queue is an unlimited queue with no limit as to the number of URLs allowed in the queue, subject to physical limitations of the queue.

15. The method of claim 1, further comprising sending a message to the first computer indicating denial of the URL request if the URL request is denied.

16. The method of claim 1, further comprising enabling an operator of a third computer to determine whether to grant access of the requested URL to the first computer when the operator of the second computer is unavailable and the requested URL is not found in the approved table of information, wherein the operator of the first computer comprises a child, the operator of the second computer comprises a parent/guardian and the operator of the third computer comprises one of a trusted friend and family member.

17. The method of claim 1, wherein the URL request is logged.

18. The method of claim 1, further comprising updating the table of information if the URL request is approved.

19. The method of claim 1, further comprising updating a table of denied URLs if the URL request is denied.

20. A method for monitoring Internet browsing:
    receiving a URL (universal resource locator) request from a first computer;
    comparing the URL request with URL entries in an approved table of information;
    if the requested URL is found in the approved table of information, permitting access of the URL request by the first computer;
    if the requested URL is not found in the approved table of information, enabling an operator of a second computer to determine whether to grant access of the requested URL to the first computer, wherein the operator views at least a portion of a web page at the requested URL prior to granting or denying access,
    wherein enabling an operator of a second computer to determine whether to grant access of the requested URL to the first computer comprises:
    accessing a Web page identified by the requested URL;
    generating a thumbnail of the Web page;
    alerting the operator of the second computer of the requested URL; and
    enabling the operator of the second computer to view the thumbnail of the Web page on the second computer, wherein the operator grants access if the Web page is approved and denies access if the Web page is disapproved.

21. The method as recited in claim 20, wherein the thumbnail comprises a set of approval controls for enabling the operator of the second computer to approve or disapprove access to the Web page by the first computer.

22. The method as recited in claim 20, wherein permitting access of the URL request by the first computer if the requested URL is found in the approved table of information comprises:
 accessing a Web page identified by the requested URL; and
 routing the Web page to the first computer for browsing.

23. The method as recited in claim 20, further comprising sending a denial message to the first computer indicating denial of the URL request if the URL request is denied.

24. The method of claim 20, further comprising enabling an operator of a third computer to determine whether to grant access of the requested URL to the first computer when the operator of the second computer is unavailable and the requested URL is not found in the approved table of information, wherein the operator of the first computer comprises a child, the operator of the second computer comprises a parent/guardian and the operator of the third computer comprises one of a trusted friend and family member.

25. The method as recited in claim 20, wherein the operator of a second computer, when unavailable, is notified of the request via one of a plurality of devices, wherein the plurality of devices comprise a work computer, a personal digital assistant, and a cell phone.

26. An article comprising: a storage medium having a plurality of machine accessible instructions, wherein when the instructions are executed by a processor, the instructions provide for receiving a URL (universal resource locator) request from a first computer;
 comparing the URL request with URL entries in an approved table of information;
 if the requested URL is found in the approved table of information, permitting access of the URL request by the first computer;
 if the requested URL is not found in the approved table of information, enabling an operator of a second computer to determine whether to grant access of the requested URL to the first computer,
 wherein instructions for enabling an operator of a second computer to determine whether to grant access of the requested URL to the first computer comprises instructions for:
 accessing a Web page identified by the requested URL;
 generating a thumbnail of the Web page;
 alerting the operator of the second computer of the requested URL; and
 enabling the operator of the second computer to view the thumbnail of the Web page on the second computer, wherein the operator grants access if the Web page is approved and denies access if the Web page is disapproved.

27. The article of claim 26, wherein instructions for alerting the operator of the second computer of the requested URL comprises instructions for enabling an alert icon to do one of blink, change color, blink and change color, change bitmap and animate.

28. The article of claim 26, wherein instructions for enabling the operator of the second computer to view the thumbnail of the Web page on the second computer comprises instructions for enabling the operator to place a mouse over an alert icon, wherein placement of the mouse over the alert icon causes a window of the thumbnail of the Web page to drop down.

29. The article of claim 26, wherein instructions for enabling the operator of the second computer to view the thumbnail of the Web page on the second computer comprises instructions for enabling the operator to click on an alert icon, wherein clicking the alert icon causes a browsable full frame of the requested Web page to be viewed.

30. The article of claim 26, wherein the thumbnail comprises a set of approval controls for enabling the operator of the second computer to approve or disapprove access to the Web page by the first computer.

31. The article of claim 10, wherein the set of approval controls include an approve control, the approve control including a drop down menu, the drop down menu including a plurality of acceptance options from which the operator may select.

32. The article of claim 11, wherein the plurality of acceptance options comprise a link depth and a time period in which the Web page may be viewed.

33. The article of claim 10, wherein the set of approval controls include a denial control, the denial control including a drop down menu, the drop down menu including a plurality of denial options from which the operator may select.

34. The article of claim 13, wherein the plurality of denial options includes denial for a predetermined period of time, denial to consult with another, denial to perform research, and denial: ask again later.

35. The article of claim 26, wherein multiple URLs are requested by the first computer, each URL being placed in a queue awaiting approval.

36. The article of claim 26, wherein instructions for permitting access of the URL request by the first computer if the requested URL is found in the approved table of information comprises instructions for:
 accessing a Web page identified by the requested URL; and
 routing the Web page to the first computer for browsing.

37. The article of claim 26, further comprising instructions for updating the table of information if the URL request is approved.

38. The article of claim 26, further comprising instructions for updating a table of denied URLs if the URL request is denied.

39. A system for monitoring Internet browsing comprising:
 a first computer to request access to a URL;
 a second computer to access a Web page associated with the requested URL through a gatekeeper, the second computer to enable the first computer to access the Web page through the gatekeeper if the second computer approves the Web page for viewing on the first computer,
 wherein the gatekeeper accesses the requested URL, and if the requested URL is not included in a list of acceptable URLs on the gatekeeper, generates a thumbnail of the Web page associated with the requested URL, and displays the thumbnail of the Web page via a browser of the second computer.

40. The system of claim 39, wherein the first computer comprises a child personal computer (PC) and the second computer comprises a parent/guardian PC.

41. The system of claim 39, wherein the gatekeeper comprises a personal computer.

42. The system of claim 39, wherein the second computer comprises the gatekeeper.

43. The system as recited in claim 39, further comprising a third computer to enable the gatekeeper to escalate the request to access the URL to the third computer for approval when the operator of the second is unavailable.

44. The system of claim 39, further comprising a third computer to enable the gatekeeper to escalate the request to access the URL to the third computer for approval when the operator of the second is unavailable.

45. The system of claim 44, wherein an operator of the first computer comprises a child, an operator of the second computer comprises a parent/guardian, and an operator of the third computer comprises a trusted friend or family member.

46. The system as recited in claim 39, wherein upon approval by an operator on the second computer, the operator having viewed the thumbnail, the URL is added to the approved list.

47. The system as recited in claim 39, wherein the gatekeeper comprises a module residing on the second computer.

* * * * *